United States Patent
Yu

(10) Patent No.: US 10,011,498 B2
(45) Date of Patent: Jul. 3, 2018

(54) METHOD OF MAGNETITE AND FERRITE NANOPARTICLE SYNTHESIS

(71) Applicant: Weiyong Yu, Shreveport, LA (US)

(72) Inventor: Weiyong Yu, Shreveport, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 14/974,020

(22) Filed: Dec. 18, 2015

(65) Prior Publication Data

US 2016/0176722 A1    Jun. 23, 2016

Related U.S. Application Data

(60) Provisional application No. 62/093,541, filed on Dec. 18, 2014.

(51) Int. Cl.
| | |
|---|---|
| *C01G 49/00* | (2006.01) |
| *C01G 49/08* | (2006.01) |
| *C01G 51/00* | (2006.01) |
| *C01G 53/00* | (2006.01) |
| *H01F 1/00* | (2006.01) |

(52) U.S. Cl.
CPC ......... *C01G 49/08* (2013.01); *C01G 49/0018* (2013.01); *C01G 49/0063* (2013.01); *C01G 49/0072* (2013.01); *C01G 51/40* (2013.01); *C01G 53/40* (2013.01); *H01F 1/0054* (2013.01); *C01P 2004/04* (2013.01); *C01P 2004/32* (2013.01); *C01P 2004/51* (2013.01); *C01P 2004/64* (2013.01); *C01P 2006/80* (2013.01)

(58) Field of Classification Search
CPC .... C01G 49/00; C01G 49/02; C01G 49/0018; C01G 49/0063; C01G 49/0054
See application file for complete search history.

(56) References Cited

U.S. PATENT DOCUMENTS

| | | | |
|---|---|---|---|
| 2008/0003159 A1* | 1/2008 | Cheon | B82Y 25/00 423/263 |
| 2010/0119429 A1* | 5/2010 | Mullins | B82Y 30/00 423/263 |
| 2014/0072642 A1* | 3/2014 | Montaner Villalonga | A61K 33/12 424/490 |

FOREIGN PATENT DOCUMENTS

WO    WO 2012136443 A1 * 10/2012 ............. A61K 33/12

OTHER PUBLICATIONS

Mohapatra, Jeotikanta, et al. "Surface controlled magnetic properties of Fe 3 O 4 nanoparticles." AIP Conference Proceedings. vol. 1512. No. 1. AIP, 2013.*
William, W. Yu, et al. "Synthesis of monodisperse iron oxide nanocrystals by thermal decomposition of iron carboxylate salts." Chemical Communications 20 (2004): 2306-2307.*
Sun, Shouheng, et al. "Monodisperse mFe2O4 (m=Fe, Co, Mn) nanoparticles." Journal of the American Chemical Society 126.1 (2004): 273-279.*

* cited by examiner

*Primary Examiner* — Richard M Rump
(74) *Attorney, Agent, or Firm* — Davis & Bujold, P.L.L.C.; Charles Holoubek

(57) ABSTRACT

A method of producing one of magnetite and ferrite nanoparticles comprising the step of mixing an iron containing metal chemical with a fatty acid.

18 Claims, 6 Drawing Sheets

METHOD OF MAGNETITE AND FERRITE NANOPARTICLE SYNTHESIS

CROSS REFERENCE TO RELATED APPLICATIONS/PRIORITY

The present invention claims priority to U.S. Provisional Patent Application No. 62/093,541, filed on Dec. 18, 2014, which is incorporated by reference into the present disclosure as if fully restated herein.

FIELD OF THE INVENTION

The present invention relates to the field of materials synthesis. The invention comprises magnetite and ferrite nanoparticles for various magnetic property related applications.

BACKGROUND OF THE INVENTION

Ferrite is a type of compounds usually composed of iron oxide and one or more additional metal oxides chemically. These compounds are ferromagnetic, meaning they can be magnetized by or attracted to a magnet, and therefore have broad applications in electronic inductors, transformers, electromagnets, and data storage. Nanosized ferrite particles have even broader application potentials mostly due to their unique size-dependent magnetic properties, which make them widely used in areas in addition to the afore-mentioned, such as magnetic separation, environmental remediation, magnetic data recording, magnetic thermal fluids, drug delivery, hyperthermia therapy, and magnetic resonance imaging. The existing synthesis methods involve complicated procedures and use special metal precursors, or the need to convert precursors to required intermediates. For example, one method requires making metal oleate salts (or in general, metal carboxylate salts) from the reaction of selected metal oxides and oleic acid at high temperature (*Chem. Commun.* 2004, 2306-2307; *Nat. Mater.* 2004, 3, 891-895.); another method uses $Fe(CO)_5$ as the starting material for $Fe_2O_3$ and $Fe_3O_4$ nanoparticle synthesis (*J. Am. Chem. Soc.*, 2001, 123, 12798.). Some researchers use co-precipitation of $FeCl_2$ and $FeCl_3$ in water with bases. This co-precipitation usually produces wider size distribution of the particle sizes.

SUMMARY OF THE INVENTION

Wherefore, it is an object of the present invention to overcome the above mentioned shortcomings and drawbacks associated with the prior art.

The present invention makes ferrite nanoparticles with controlled size and narrow size distribution from inorganic or organic simple metal compounds or salts. The ferrite compounds stated in this invention include traditional stoichiometric compounds of $MFe_2O_4$, where M can be any metal, but preferably Mg, Ba, Sr, Al, Co, Mn, Zn, Ni, and rare earth. When M is Fe, the molecular formula becomes $Fe_3O_4$ (magnetite). The ferrite compounds stated in this invention also include nonstoichiometric compounds of $M_mFe_xO_y$, $M_mN_nFe_2O_4$, or $M_mN_nFe_xO_y$, and $M_mN_nL_LFe_xO_y$ where M, N, and L are different metals. The magnetite and ferrite nanoparticles (general formulas: $M_mFe_xO_y$, $M_mN_n$-$Fe_xO_y$, and $M_mN_nL_LFe_xO_y$) are made by mixing the simple metal compounds and fatty acids in high boiling point solvents and heating this solution to certain temperatures and maintain the temperatures for a certain amount of time. The simple metal compounds include but not limited to metal chlorides, metal acetates, metal nitrates, metal carbonates, metal oxalates, and even metal hydroxides. These simple compounds can be anhydrous or hydrated. The fatty acids include but not limited to oleic acid, stearic acid, myristic acid, and erucic acid. The high boiling point solvents may be liquid or solid at room temperature, such as 1-octadecene, Therminol heat transfer fluids (e.g., Therminol XP, Therminol 75), paraffin, and wax. This method produces magnetite and ferrite nanoparticles with different sizes, with each size being narrowly distributed or monodisperse. The certain temperature is preferably 250° C. to 350° C., and mostly preferably 300° C. to 320° C. The mixture is maintained at the temperature for a certain time which is preferably 30 min to a four or more hours, and mostly preferably 1 to 3 hours.

BRIEF DESCRIPTION OF THE DRAWING

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

DETAILED DESCRIPTION OF THE INVENTION

The present invention will be understood by reference to the following detailed description, which should be read in conjunction with the appended drawings. It is to be appreciated that the following detailed description of various embodiments is by way of example only and is not meant to limit, in any way, the scope of the present invention.

Iron and other metal salts/compounds directly react with fatty acid to generate metal carboxylate intermediates that pyrolyze to form ferrite nanoparticles with controlled size and narrow or monodisperse size distribution. This is a one-pot in situ synthesis method with time and cost savings.

Figure 1:
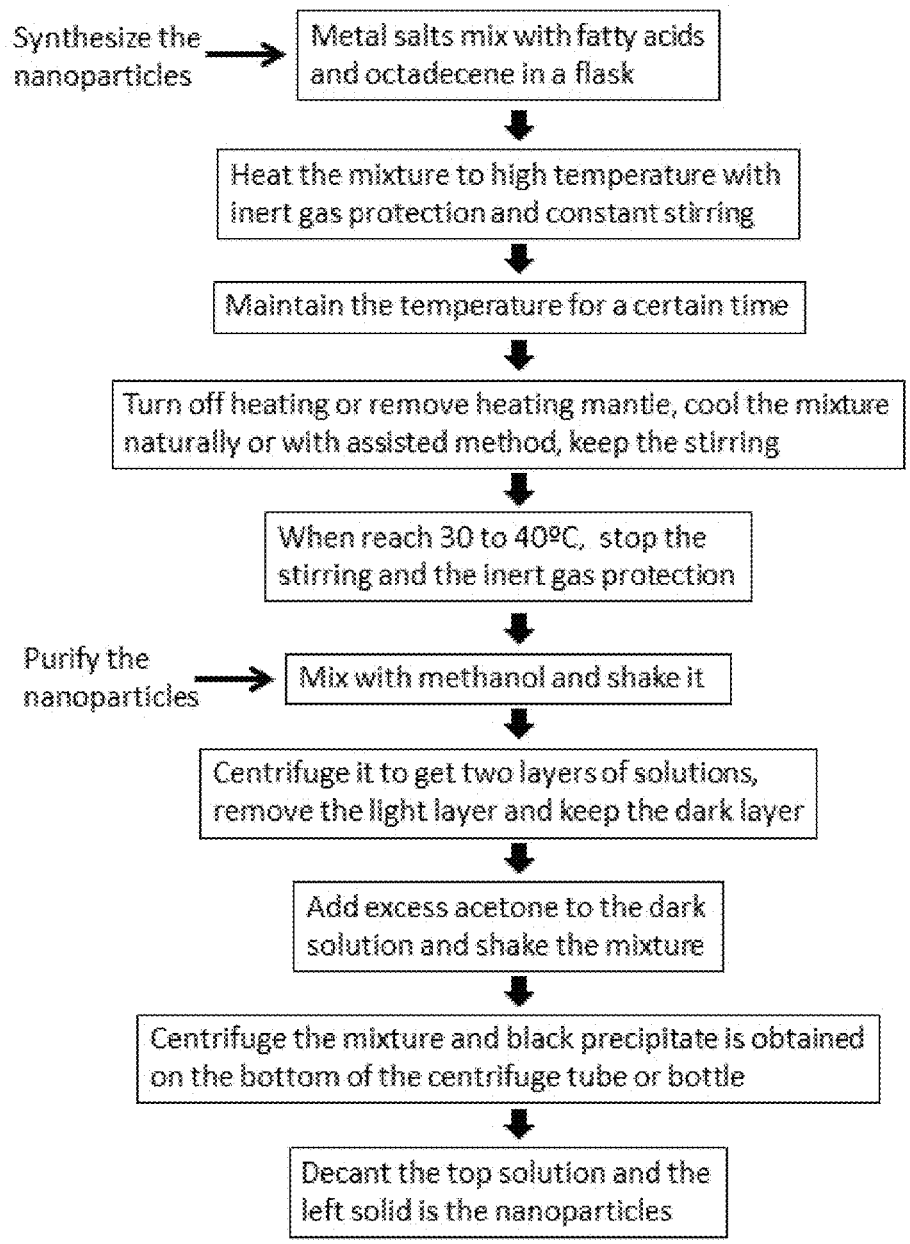
FIG. 1 is a flow chart of the synthesis and purification procedures of one embodiment.

Ferrite nanoparticles are synthesized in a three-neck flask equipped with condenser, magnetic stirrer, thermocouple and heating mantle. Typically, an iron containing metal chemical, which may be mixed with a compound or compounds containing another metal or metals including non-iron containing metal compounds, (in ionic or elemental form) is added to the flask and then fatty acid(s) is introduced with a high boiling-point solvent (for example, having a boiling point over 310° C.). The mixture is heated by the heating mantle or other heating devices to a certain temperature (preferrably 250° C. to 350° C., mostly preferably 300° C. to 320° C.). After reaching the temperature, the mixture is maintained at the temperature for a certain time (preferably 30 min to a few hours, mostly preferably 1 to 3 hours), and then the heating device is turned off (or the mixture is removed from the heating device) and let the mixture cool down naturally (forced cooling with any means, such as blowing air to the flask, placing the flask in a water bath are also good) (FIG. 1). During the whole process, the mixture is preferably protected by inert gas flow (e.g., nitrogen or argon gas) and is preferably stirred (preferably 600-1500 rpm) all the time. An inert gas is used to avoid any undesired side-reactions (e.g. oxidation of fatty acid) and potentially dangerous combustion of the hot organic solvents. However, the presence of air has little effect on the resulting nanoparticle's size or quality.

Figure 5:
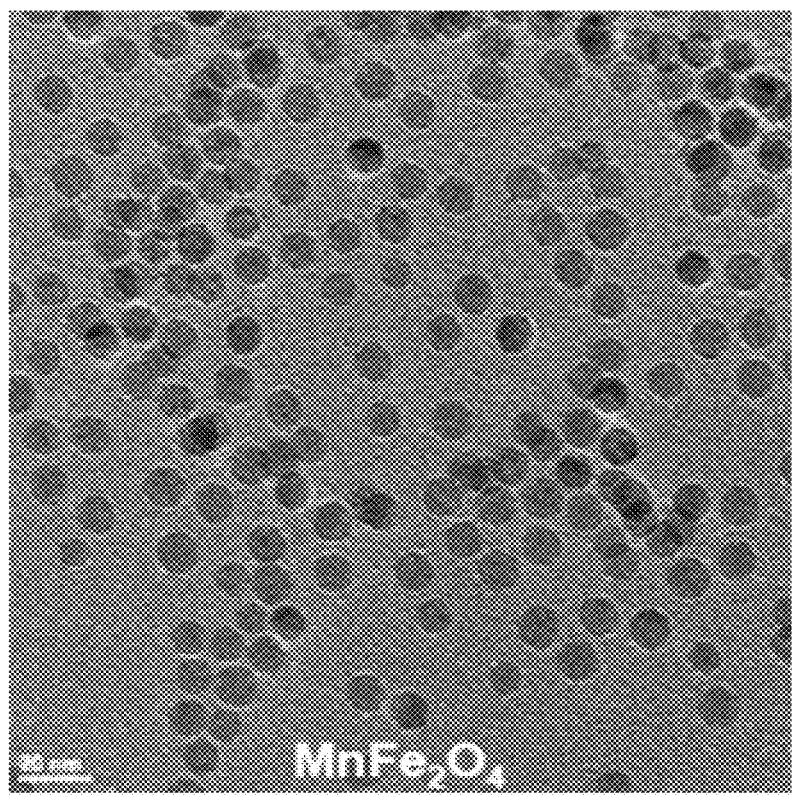
FIG. 5 is a TEM image of a $MnFe_2O_4$ nanoparticle sample created according to the present invention.
Figure 6:
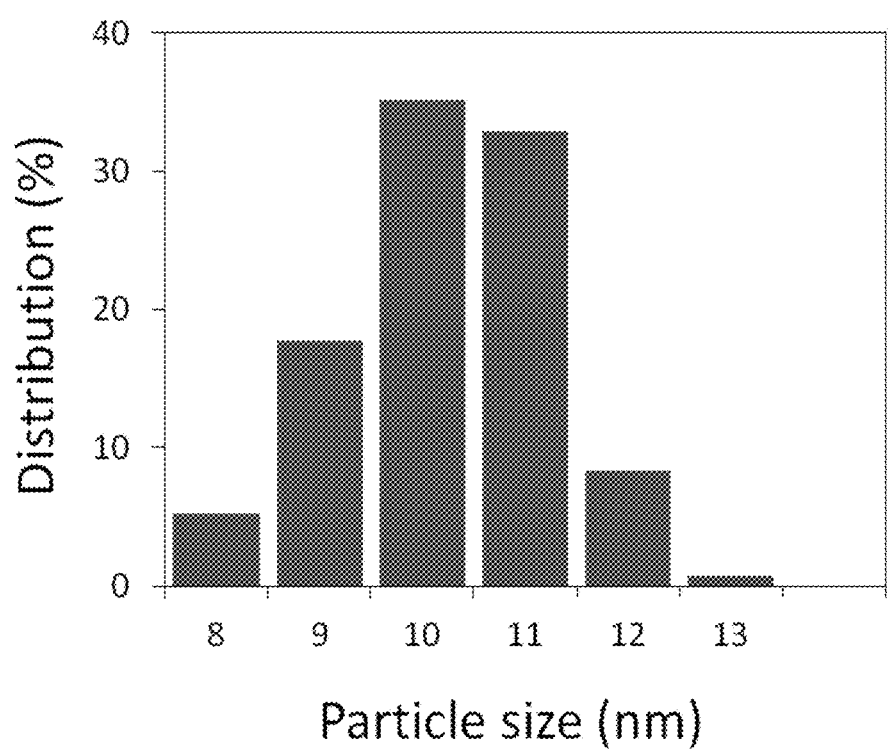
FIG. 6 shows the size distribution of a $Fe_3O_4$ nanoparticle sample created according to the present invention. It shows an average size of 10.0 nm with a relative standard deviation of 10%.

When the reaction is completed, the mixture in the flask contains the desired ferrite nanoparticles, some unreacted precursors (mainly metal-containing intermediate compounds), and the solvents. In order to get substantially pure nanoparticles, a purification operation is preferred. To purify the nanoparticles, the reaction mixture is firstly mixed with a certain volume (preferably about the same volume) of methanol (other simple alcohols also work, such as ethanol, propanol, isopropanol) and then agitated (or shaken or stirred). This solution is centrifuged (preferably 2000-3000 rpm) or is left untouched for a while, resulting in a dark and a light layer. The dark layer contains nanoparticles, which is then separated from the light layer. Then acetone (the volume ratio of acetone to dark solution is preferably 2-3 to 1) is added to the separated dark solution and the mixture is shaken for a while (usually a few to tens seconds). This mixture is centrifuged (preferably 2000-3000 rpm) to get precipitation. The upper solution is decanted and the precipitate is the powder form of the synthesized nanoparticles. These nanoparticles can be re-dispersed in organic solvents, such as hexane, toluene, and chloroform. Ferrite nanoparticles are completely recovered during the purification process, and no size selective precipitation is required. The TEM micrographs (FIGS. 2, 3, 4, 5) demonstrate several examples of the high quality as-synthesized nanoparticles. All the as-synthesized magnetite and ferrite nanoparticles appear as substantially spherical dots with very narrow size distributions, typically 5-10% as the relative standard deviation. Other shapes, such as cubic nanoparticles are also achievable. FIG. 6 shows the particle size distribution of a magnetite nanoparticle product with an average size of 10.0 nm and a relative standard deviation of 10%.

Examples: $Fe_3O_4$ Nanoparticles 4 mmol $Fe(NO_3)_3.9H_2O$, 16 mmol oleic acid, and 20 ml 1-octadecene were added into a 50 ml three-neck flask. The flask was placed in a heating mantle which was controlled by a thermocouple temperature controller. It was also equipped with a condenser and $N_2$ or Ar inert gas was used to make sure the flask was protected from the air. Then the mixture was stirred by a magnetic stirrer and was heated directly to 315° C. for 2 hours to get 10 nm $Fe_3O_4$ nanoparticles. The products were purified by methanol extraction and acetone precipitation and the obtained powder could be dissolved in hexane, toluene, chloroform, or other similar solvents. The nanoparticles can be precipitated multiple times with acetone to remove any unreacted precursors (metal compound, oleic acid), intermediates, and the high boiling point solvents, but usually one time precipitation can make the nanoparticles with >99% purity. This high purity is typical for the purification process for other ferrite nanoparticles created according to the present invention, and especially ferrite nanoparticles created according the embodiments in the following examples. The precursor ($Fe(NO_3)_3.9H_2O$ in this case) can be converted to nanoparticles with variable yields depended on reaction time; longer time generally makes higher yield. In this example, 85% yield was achieved. The particle size distribution of this magnetite nanoparticle product is shown in FIG. 6; it has an average size of 10.0 nm and a relative standard deviation of 10%.

$CoFe_2O_4$ Nanoparticles.

Figure 2:
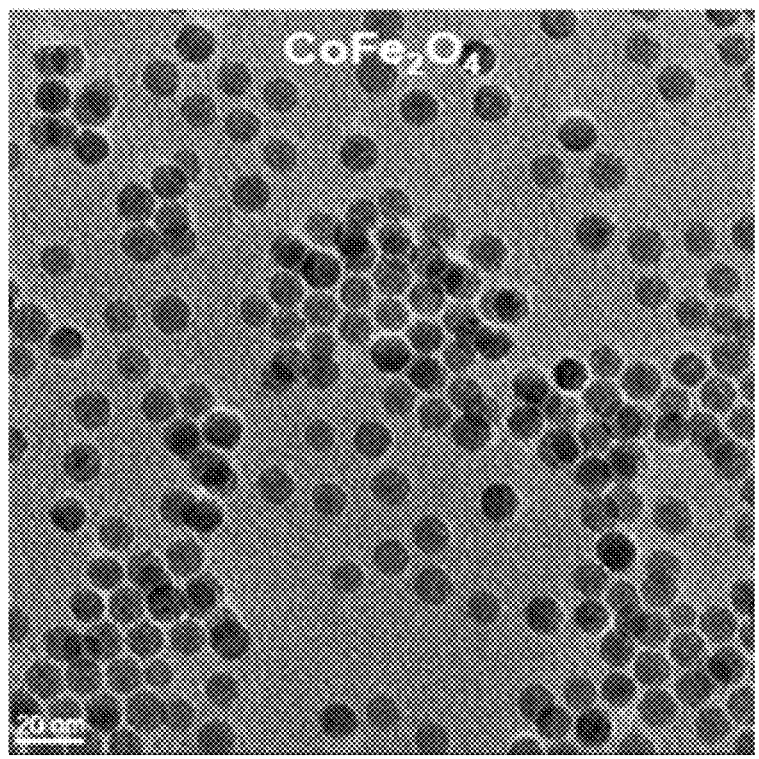
FIG. 2 is a transmission electron microscopy (TEM) image of a $CoFe_2O_4$ nanoparticle sample created according to the present invention.

2 mmol $FeCl_3.9H_2O$, 1 mmol $CoCl_2$, 16 mmol oleic acid, and 20 ml 1-octadecene were placed in a 50 ml three-neck flask. The flask was placed in a heating mantle which was controlled by a thermocouple temperature controller. It was also equipped with a condenser and $N_2$ or Ar inert gas was used to make sure the flask was protected from the air. The mixture was stirred by a magnetic stirrer and was directly heated to 320° C. and this temperature was maintained for 2 hours to get 11 nm $CoFe_2O_4$ nanoparticles, as shown in FIG. 2. The products were precipitated out using acetone and the obtained powder could be dissolved in hexane, toluene, chloroform, or other similar solvents. The nanoparticles can be precipitated multiple times with acetone to substantially completely remove any unreacted precursors (metal compounds, oleic acid), intermediates, and the high boiling point solvents.

$Zn_{1.5}Fe_{1.8}O_4$ Nanoparticles.

In a 250 ml three-neck flask, 6 mmol $Fe(NO_3)_3.6H_2O$, 6 mmol $Zn(NO_3)_2.6H_2O$, 50 mmol oleic acid, and 150 ml 1-octadecene were mixed together. The flask was placed in a heating mantle which was controlled by a thermocouple temperature controller. It was also equipped with a condenser and $N_2$ or Ar inert gas was used to make sure the flask was protected from the air. A magnetic stirrer or an overhead mechanic stirrer was used to stir the solution, and the solution was heated directly to 320° C. and was maintained at this temperature for 1 hour to get 21 nm $Zn_{1.5}Fe_{1.8}O_4$ nanoparticles. The products were precipitated out using acetone and this obtained powder could be dissolved in hexane, toluene, chloroform, or similar solvents. The particles can be precipitated multiple times with acetone to substantially completely remove any unreacted precursors (metal compounds, oleic acid), intermediates, and the high boiling point solvents.

$MnFe_2O_4$ Nanoparticles.

In a 250 ml three-neck flask, 6 mmol $Fe(NO_3)_3.9H_2O$, 2 mmol $Mn(NO_3)_2.4H_2O$, 36 mmol oleic acid, and 150 ml 1-octadecene were mixed together. The flask was placed in a heating mantle which was controlled by a thermocouple temperature controller. It was also equipped with a condenser and $N_2$ or Ar inert gas was used to make sure the flask was protected from the air. A magnetic stirrer or an overhead mechanic stirrer was used to stir the solution, and the solution was heated directly to 320° C. and was maintained at this temperature for 1.5 hours to get 18 nm $MnFe_2O_4$ nanoparticles. The products were precipitated out using acetone and this obtained powder could be dissolved in hexane, toluene, chloroform, or similar solvents. The particles can be precipitated multiple times with acetone to remove substantially all unreacted precursors (metal compounds, oleic acid), intermediates, and the high boiling point solvents.

$Mn_{0.5}Zn_{0.5}Fe_2O_4$ Nanoparticles.

2 mmol $Fe(NO_3)_3.9H_2O$, 0.5 mmol $Zn(NO_3)_2.6H_2O$, 0.5 mmol $Mn(NO_3)_2.4H_2O$, 10 mmol oleic acid, and 30 ml 1-octadecene were placed in a 100 ml three-neck flask. The flask was placed in a heating mantle which was controlled by a thermocouple temperature controller. It was also equipped with a condenser, a magnetic stirrer, and $N_2$ or Ar inert gas was used to make sure the flask was protected from the air. The mixture was stirred and heated directly to 320° C. and maintained at this temperature for 3 hours to get 21 nm $Mn_{0.5}Zn_{0.5}Fe_2O_4$ nanoparticles. The products were precipitated out using acetone and this obtained powder could be dissolved in hexane, toluene, chloroform, or similar solvents. The particles can be precipitated multiple times with acetone to remove any unreacted precursors (metal compounds, oleic acid), intermediates, and the high boiling point solvents.

Figure 3:
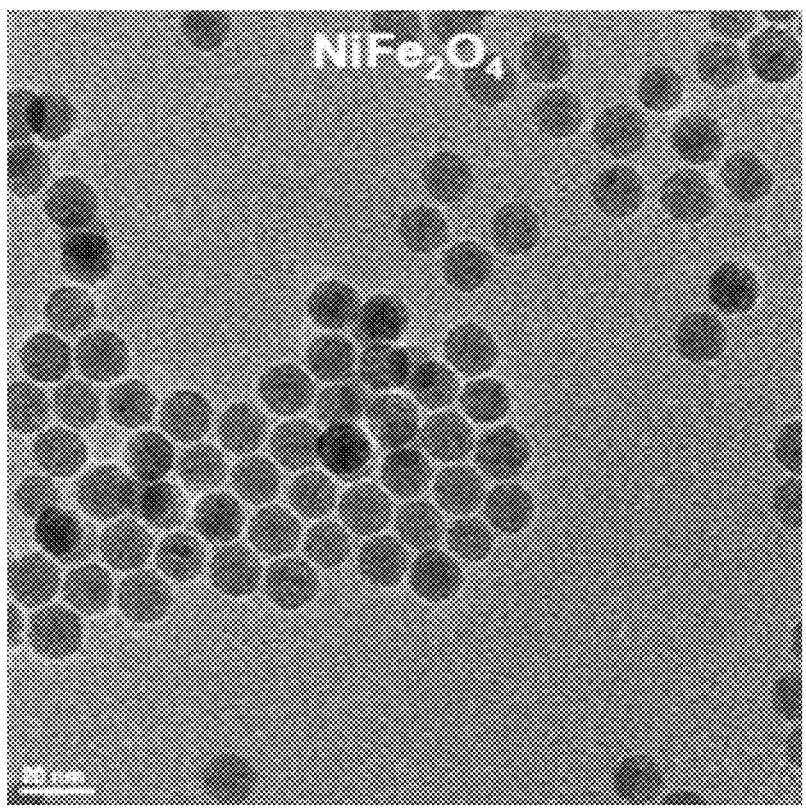
FIG. 3 is a TEM image of a $NiFe_2O_4$ nanoparticle sample created according to the present invention.
Figure 4:
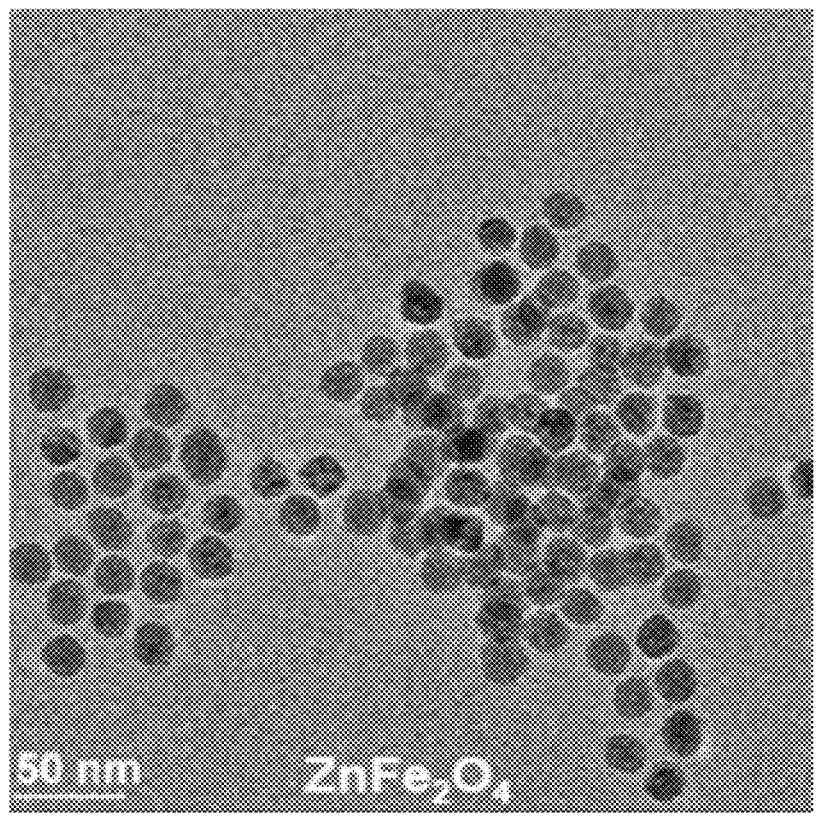
FIG. 4 is a TEM image of a $ZnFe_2O_4$ nanoparticle sample created according to the present invention.

The disclosed method was used with reactants $Fe(NO_3)_3 \cdot 9H_2O$ and $Ni(NO_3)_2 \cdot 6H_2O$ to yield 14 nm nanoparticles, as shown in FIG. 3; $Fe(NO_3)_3 \cdot 9H_2O$ and $Zn(NO_3)_2 \cdot 6H_2O$ to yield 22 nm $ZnFe_2O_4$ nanoparticles, as shown in FIG. 4; and $Fe(NO_3)_3 \cdot 9H_2O$ and $Mn(NO_3)_2 \cdot 4H_2O$ to yield 10.5 nm $MnFe_2O_4$ nanoparticles, as shown in FIG. 5.

While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

Wherefore we claim:

1. A method of producing one of magnetite and ferrite nanoparticles in a one-pot in situ synthesis comprising the steps of:
   mixing iron (III) nitrate [$Fe(NO_3)_3$] with a fatty acid to form a mixture;
   mixing a solvent with the mixture;
   heating the solvent mixture to and maintaining the solvent mixture at a temperature between 300° C. and 320° C.; and
   precipitating out one of magnetite and ferrite nanoparticles;
   wherein the nanoparticles have a relative standard deviation in diameter less than or equal to 10%.

2. The method of claim 1 wherein the solvent is one of paraffin and wax.

3. The method of claim 1 wherein the solvent is one of a Therminol heat transfer fluid, Therminol XP, Therminol 75.

4. The method of claim 1 wherein the solvent has a boiling point above 250° C.

5. The method of claim 1 further comprising the step of heating the mixture to a temperature above 315° C.

6. The method of claim 1 further comprising the step of maintaining the mixture between 300° C. and 320° C. for a period of time of at least 30 minutes.

7. The method of claim 1 wherein the nanoparticles are between 0.5 and 1000 nm in size.

8. The method of claim 1 wherein the nanoparticles are substantially spherical in shape.

9. The method of claim 1 wherein the nanoparticles have a chemical formula of one of $M_mFe_xO_y$, $M_mN_nFe_2O_4$, $M_mN_nFe_xO_y$, and $M_mN_nL_LFe_xO_y$ where M, N, and L are different metals and subscript m, n, L, x, and y are non-negative rational numbers greater than zero.

10. The method of claim 1 wherein the fatty acid is one of oleic acid, stearic acid, myristic acid, and erucic acid.

11. The method of claim 1 wherein the fatty acid is only one of oleic acid, stearic acid, myristic acid, and erucic acid.

12. The method of claim 1 further comprising the step of adding a non-iron containing metal compound to the mixture.

13. The method of claim 1 wherein the solvent is one of liquid or solid at room temperature.

14. The method of claim 1 wherein the solvent is one of 1-octadecene, a Therminol heat transfer fluid, Therminol XP, Therminol 75, paraffin, and wax.

15. A method of producing one of magnetite and ferrite nanoparticles in a one-pot in situ synthesis comprising the steps of:
   mixing an iron nitrate with a fatty acid and a solvent to create a solvent mixture;
   heating the solvent mixture to between 300° C. and 320° C. with one of agitation and stirring;
   passing a non-oxygenated gas over the solvent mixture;
   maintaining the solvent mixture at a temperature between 300° C. and 320° C. for at least 30 minutes;
   cooling the solvent mixture to below 40°;
   adding a volume of alcohol to the solvent mixture, wherein the alcohol is one of methanol ethanol, propanol, and isopropanol;
   agitating the solvent mixture;
   centrifuging the solvent mixture;
   removing a light layer of material from the solvent mixture;
   adding acetone to a remaining dark layer of material in the solvent mixture to create an acetone mixture;
   agitating the acetone mixture;
   precipitating out one of magnetite and ferrite nanoparticles, wherein the nanoparticles have a relative standard deviation in diameter less than or equal to 10%;
   centrifuging the acetone mixture; and
   decanting a top layer of the centrifuged acetone mixture.

16. The method of claim 1 further comprising the step of adding an alcohol to the mixture.

17. The method of claim 1 wherein the nanoparticles have a relative standard deviation in diameter less than or equal to 5%.

18. A method of producing one of magnetite and ferrite nanoparticles comprising the steps of:
   mixing iron (III) nitrate [$Fe(NO_3)_3$] with a fatty acid to form a mixture;
   mixing a solvent with the mixture; and
   precipitating out one of magnetite and ferrite nanoparticles;
   wherein the nanoparticles have a relative standard deviation in diameter less than or equal to 10%.

* * * * *